US 6,565,232 B1

(12) United States Patent
Goldstein et al.

(10) Patent No.: US 6,565,232 B1
(45) Date of Patent: May 20, 2003

(54) APPARATUS HAVING MAGNIFYING, ILLUMINATING AND MIRRORING ATTRIBUTES

(76) Inventors: Steven H. Goldstein, 10552 E. Cannon Dr., Scottsdale, AZ (US) 85258; Carol D. Goldstein, 10552 E. Cannon Dr., Scottsdale, AZ (US) 85258; Mary Margaret Jelava-Risley, 10475 N. 105th Way, Scottsdale, AZ (US) 85258; William Buell Risley, 10475 N. 105th Way, Scottsdale, AZ (US) 85258

( * ) Notice: Subject to any disclaimer, the term of this patent is extended or adjusted under 35 U.S.C. 154(b) by 0 days.

(21) Appl. No.: 09/952,798

(22) Filed: Sep. 14, 2001

Related U.S. Application Data
(60) Provisional application No. 60/259,420, filed on Dec. 30, 2000.

(51) Int. Cl.[7] ............................................. F21V 33/00
(52) U.S. Cl. .................. 362/253; 362/200; 362/208; 362/109; 362/135; 362/136; 362/125
(58) Field of Search ................................ 362/200, 208, 362/109, 135, 136, 253, 125

(56) References Cited

U.S. PATENT DOCUMENTS

| | | | | |
|---|---|---|---|---|
| 4,393,610 A | * | 7/1983 | Adrian | 40/625 |
| 4,889,419 A | * | 12/1989 | Kite | 350/600 |
| 5,457,613 A | * | 10/1995 | Vandenbelt et al. | 362/200 |
| 5,608,203 A | * | 3/1997 | Finkelstein et al. | 235/487 |
| 5,893,631 A | * | 4/1999 | Padden | 362/201 |
| 5,927,846 A | * | 7/1999 | Sinclair | 362/189 |
| 6,039,454 A | * | 3/2000 | Hallgrimsson | 362/116 |
| 6,070,990 A | * | 6/2000 | Dalton et al. | 362/201 |

* cited by examiner

Primary Examiner—Sandra O'Shea
Assistant Examiner—Jacob Y. Choi
(74) Attorney, Agent, or Firm—Parsons & Goltry; Michael W. Goltry; Robert A. Parsons

(57) ABSTRACT

Disclosed is a chassis having opposing major faces and an opening. The chassis is approximately the size of a commercial card, namely, a bankcard such as a credit card or a debit card, which are ubiquitous in modern society. A magnifying lens is disposed at the opening. The chassis carries a switch and a light. The light is capable of being actuated in response to actuation of the switch and is disposed so that it is capable of directing light away from the chassis so that objects can be magnified and illuminated.

25 Claims, 5 Drawing Sheets

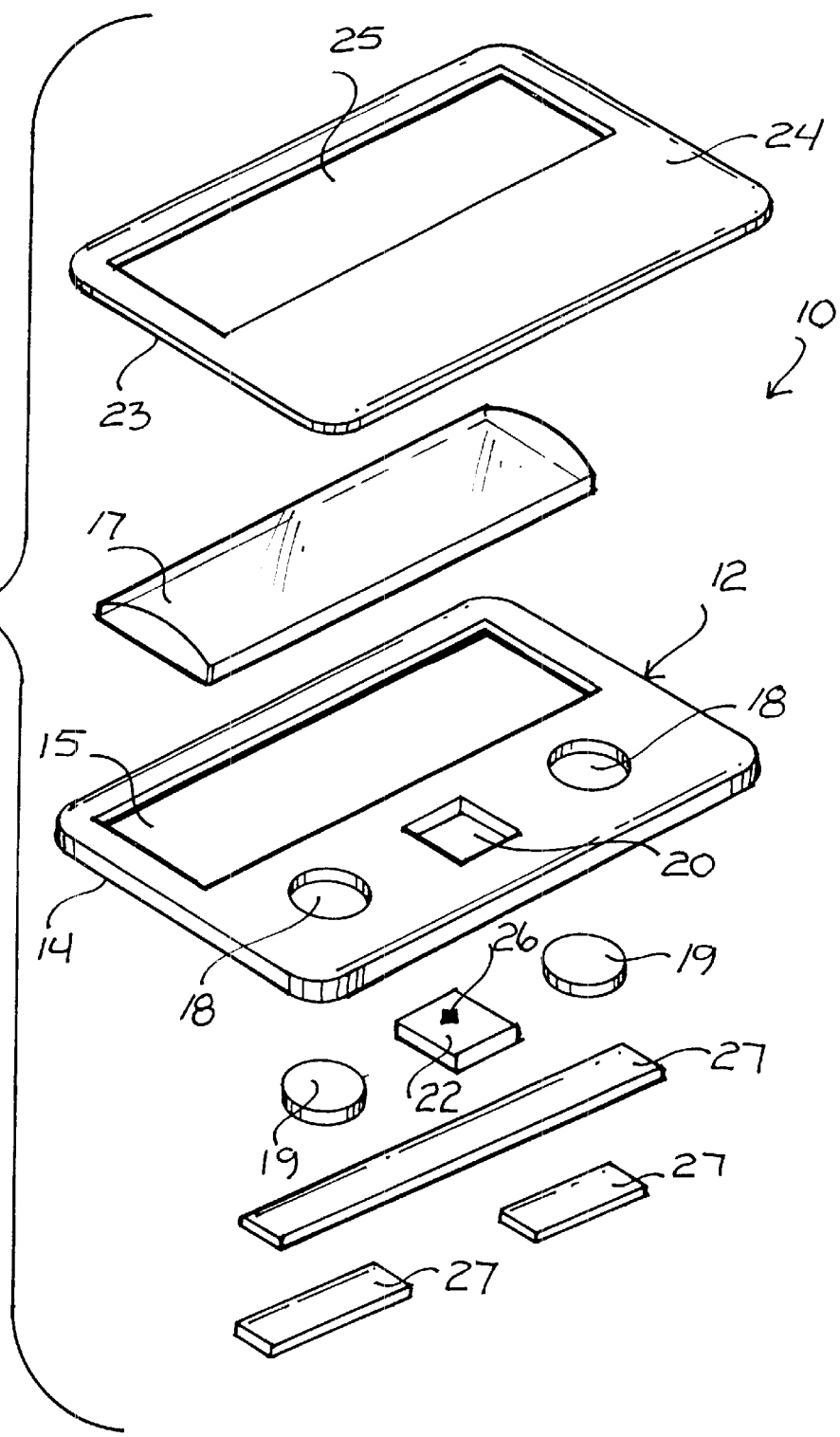

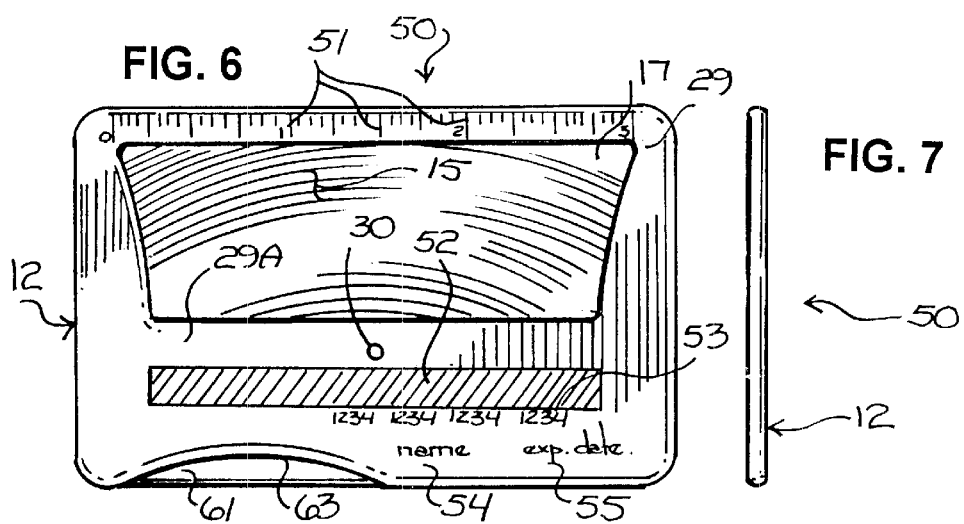
FIG. 6
FIG. 7
FIG. 8
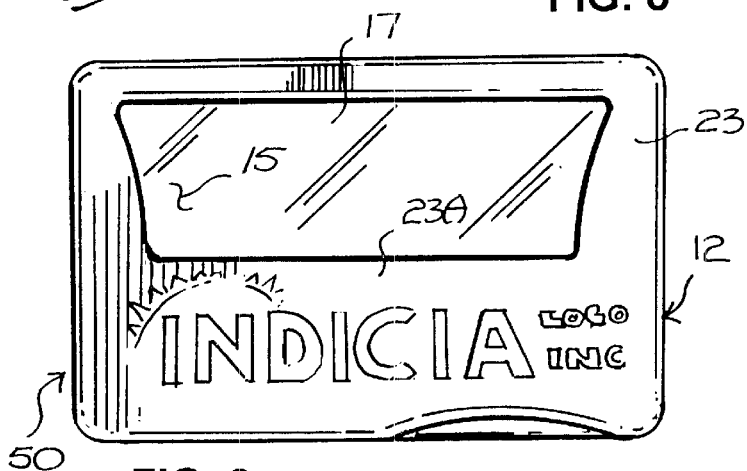
FIG. 9
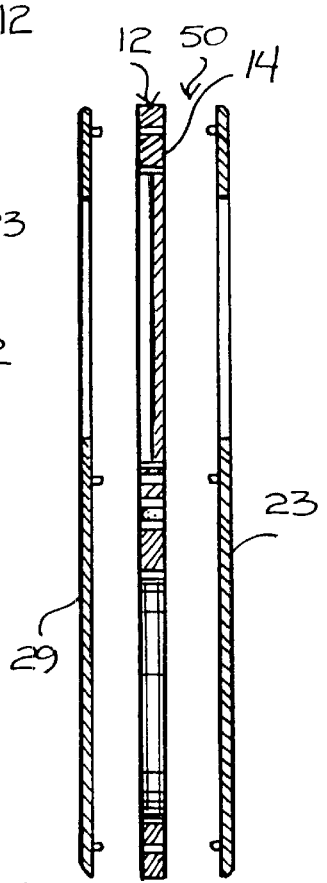
FIG. 10
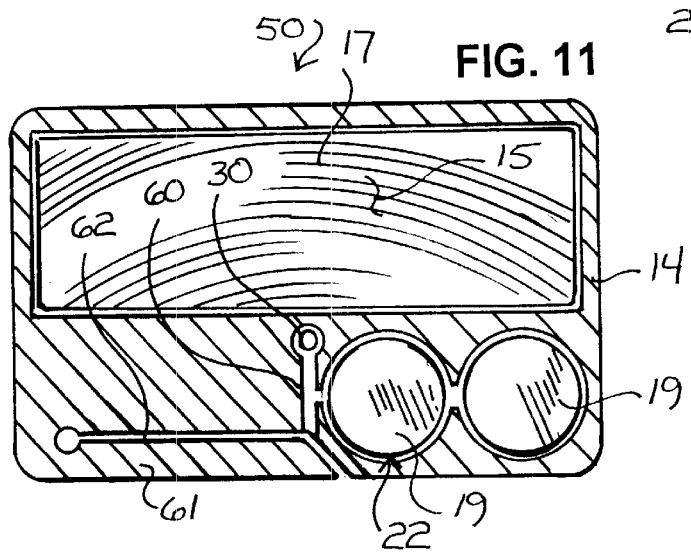
FIG. 11

APPARATUS HAVING MAGNIFYING, ILLUMINATING AND MIRRORING ATTRIBUTES

CROSS-REFERENCE TO RELATED APPLICATIONS

This application claims the benefit of Provisional Application Ser. No. 60/259,420, filed Dec. 30, 2000.

FIELD OF THE INVENTION

This invention relates to devices having magnifying, illuminating and mirroring attributes and to bankcards.

BACKGROUND OF THE INVENTION

Commercial cards, namely, credit cards and debit cards, are ubiquitous in modern society as are phone cards and insurance cards. Cards such as these are approximately 3⅛ inches long by 2⅛ inches wide, and people carry and store these cards in sleeve-like compartments/receptacles formed in wallets and day timers and other forms of personal carrying devices that are specifically sized for holding cards of this size.

Many people have difficulty seeing, especially the elderly and those that suffer from cataracts, glaucoma, macular degeneration and other eye diseases and disorders, in addition to presbyopia and weakening of the eyes due to aging. Visually-impaired individuals usually employ visual aids to help them see, such as glasses, bifocals and magnifying glasses, and these visual aids for many are especially necessary in low light atmospheres, such as in dark restaurants and dimly lit rooms. Enhanced illumination is also often required for individuals to see in dark atmospheres.

Given the ubiquity of commercial cards and the associated ubiquity of the wallets and day timers and other personal carrying devices having storage features specifically designed for storing commercial cards, it would be highly desirable to provide a device that in size is substantially equal to that of a conventional commercial card and that incorporates visual aid and illumination attributes. It is intended that a device such as this is to be stored in a wallet, day timer or other personal carrying device along with bank cards and the like.

SUMMARY OF THE INVENTION

The above problems and others are at least partially solved and the above purposes and others realized in new and improved apparatus having magnifying, illuminating and mirroring attributes. In accordance with the principle of the invention, a preferred embodiment of the invention is a device that includes a chassis having an opening and a magnifying lens disposed at the opening. The size of the chassis approximates that of a commercial card, namely, a credit card or debit card, which are ubiquitous throughout modern society. The chassis supports a switch and a light that is capable of being actuated in response to actuation of the switch. Preferably, the chassis includes opposing major faces and the light is disposed so that it is capable of directing light away from one of the opposing major faces. The light can, however, be disposed at other locations along chassis. The device of this embodiment can also be furnished with additional features. For instance, a mirror is capable of being disposed at one of the opposing major faces and preferably the major face away from which the light directs illumination. A surface, such as a magnetic stripe, is capable of being attached to the chassis to which data is capable of being recorded. Length-measuring indicia is capable of being disposed along an edge of the chassis, which is capable of being used for carrying out length measuring tasks.

In accordance with the principle of the invention, provided is another embodiment including a device that consists of a commercial card-sized chassis having opposing major faces and a mirror disposed at one of the opposing major faces. The chassis supports a switch and a light that is capable of being actuated in response to actuation of the switch. The light is disposed so that it is capable of directing light away from the mirror. The device of the instant embodiment can also be furnished with additional features. For instance, the chassis is capable of being provided with an opening and a magnifying lens disposed at the opening. A surface, such as a magnetic stripe, is capable of being attached to the chassis to which data is capable of being recorded. Length-measuring indicia is capable of being disposed along an edge of the chassis, which is capable of being used for carrying out length measuring tasks.

In accordance with the principle of the invention, provided is yet another embodiment including a device that consists of a commercial card-sized chassis and a two-way lens disposed at the opening, which includes a magnifying side permitting magnification and a mirror side permitting reflection. The chassis supports a switch and a light that is capable of being actuated in response to actuation of the switch. The light is disposed so that it is capable of directing light away from the mirror side. The device of the instant embodiment can also be furnished with additional features. For instance, a surface, such as a magnetic stripe, is capable of being attached to the chassis to which data is capable of being recorded. Length-measuring indicia is capable of being disposed along an edge of the chassis, which is capable of being used for carrying out length measuring tasks.

In accordance with the principle of the invention, provided is yet another embodiment including a device that consists of a commercial card-sized chassis, a switch carried by the chassis and a light carried by the chassis that is capable of being actuated in response to actuation of the switch. The device of the instant embodiment can also be furnished with additional features. For instance, a mirror is capable of being attached to the chassis. The chassis is further capable of being provided with an opening and a magnifying lens disposed at the opening. A surface, such as a magnetic stripe, is capable of being attached to the chassis to which data is capable of being recorded. Length-measuring indicia is capable of being disposed along an edge of the chassis, which is capable of being used for carrying out length measuring tasks.

In accordance with the principle of the invention, provided is yet still another embodiment including a device that consists of a commercial card-sized chassis including opposing major faces and an opening, a magnifying lens disposed at the opening and a mirror disposed proximate one of the opposing major faces. The device of the instant embodiment can also be furnished with additional features. For instance, the chassis is capable of being fitted with a switch and a light that is capable of being actuated in response to actuation of the switch. The light is further capable of being disposed so that it is capable of directing light away from the mirror. A surface, such as a magnetic stripe, is capable of being attached to the chassis to which data is capable of being recorded. Length-measuring indicia is capable of being disposed along an edge of the chassis, which is capable of being used for carrying out length measuring tasks.

Consistent with the foregoing, the invention also contemplates associated methods.

BRIEF DESCRIPTION OF THE DRAWINGS

Referring to the drawings:

FIG. 2 is an exploded view of the device of FIG. 1;

FIG. 6 is a top plan of a device including a chassis having an opening, a magnifying lens disposed at the opening, a switch carried by the chassis and a light carried by the chassis that is capable of being actuated in response to actuation of the switch, in accordance with the principle of the invention;

FIG. 7 is a side elevation of the device of FIG. 1, the opposing side elevation being a substantial mirror image thereof;

FIG. 8 is a bottom end elevation of the device of FIG. 1;

FIG. 9 is a bottom plan of the device of FIG. 1;

FIG. 10 is an exploded bottom end elevation of the device of FIG. 1, illustrating a chassis and opposing overlays;

FIG. 11 is a top plan of the chassis of FIG. 10;

DETAILED DESCRIPTION OF PREFERRED EMBODIMENTS

Figure 1:
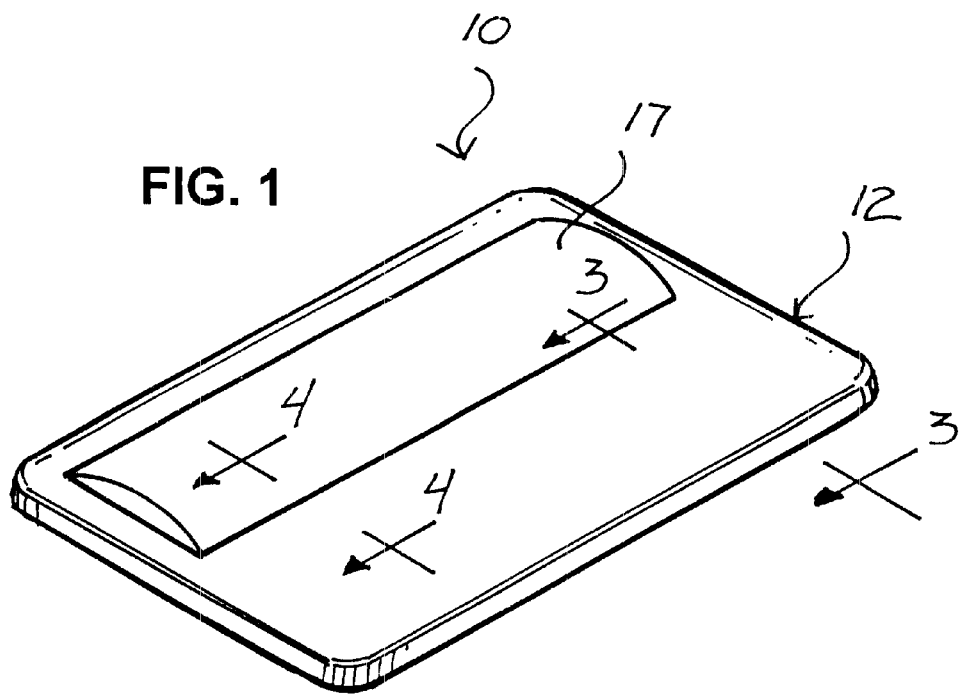
FIG. 1 is an isometric view of device including a chassis having an opening and a magnifying lens disposed at the opening, in accordance with the principle of the invention.

Turning now to the drawings, in which like reference characters indicate corresponding elements throughout the several views, attention is first directed to FIG. 1 in which is seen a device, embodying the principle of the instant invention, generally indicated by the reference character 10 and including a chassis 12 having an attached magnifying lens 17. Chassis 12, as seen in detail in FIG. 2, includes a frame 14 having an opening 15 sized and shaped to receive magnifying lens 17, openings 18 sized and shaped to receive batteries 19 and an opening 20 sized and shaped to receive electric circuit assembly 22. Preferably, frame 14 is fabricated of a semi-flexible material, such as that commonly used to fabricate commercial/bank cards such as credit and debit cards. Other materials can be used. Batteries 19 provide device 10 with needed electrical power and are of the type commercially available for use in electric wristwatches, calculators, etc. Device can be solar-powered and furnished with conventional solar empowering attachments if so desired.

Figure 3:
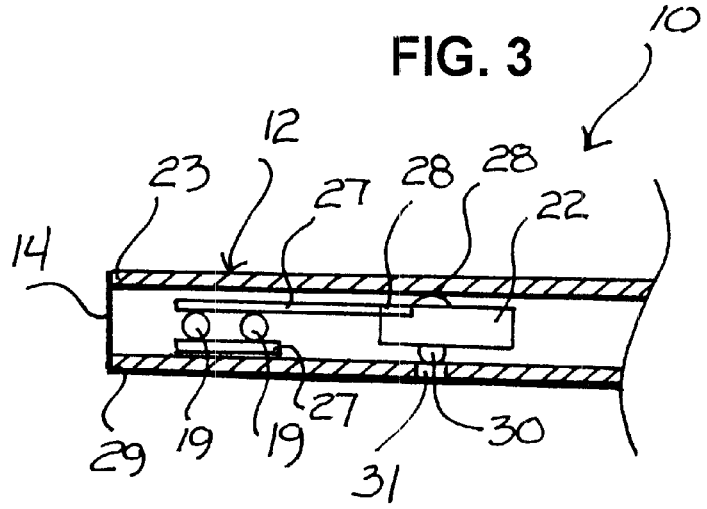
FIG. 3 is an enlarged sectional view taken along line 3—3 of FIG. 1.

A top cover or overlay 23 is bonded, such as with adhesive or lamination or heat bonding, to the topside of frame 14 and is considered part of chassis 12. Overlay 23 includes a panel portion 24 that extends over openings 18,20 and acts as a top retainer for batteries 19 and electric circuit assembly 22 and defines a major exterior side or face of device 10. Overlay 23 further includes an opening 25 that is sized and shaped to receive magnifying lens 17. Lens 17 is held in a seat formed by chassis 12 and it can be attached with a seating engagement, heat bonding, adhesive, etc. Advertising, identification or other indicia are capable of being imprinted upon, etched upon or otherwise applied or attached to the exterior side of overlay 23 at panel portion 24 so as to be capable of being easily visualized or accessed, and it can be applied at other locations along the exterior side of overlay 23. A bottom overlay is bonded to the bottom side of frame 14 in a manner like that of overlay 23, is considered part of chassis 12 and is the mirror image overlay 23. Like overlay 23, the bottom overlay extends over openings 18,20 and acts as a bottom retainer for batteries and electrical circuit assembly 22 and defines the other major exterior side or face of device 10 opposing the exterior side or face of device as defined by overlay 23. In common to overlay 23, the bottom overlay further includes an opening that is sized and shaped to receive magnifying lens 17. Bottom overlay is depicted in FIG. 3 and is denoted at 29. Advertising, identification or other indicia are capable of being imprinted upon, etched upon or otherwise applied or attached to the exterior side of the bottom overlay so as to be capable of being easily visualized or accessed. Lens 17 is visible through the two openings of the overlays. Electrical conductive strips 27 are attached to frame 14 and extend between and conductively interact with batteries 19 and electric circuit assembly 22, which permits electrical power to pass from batteries 19 to electric circuit assembly 22.

Figure 4:
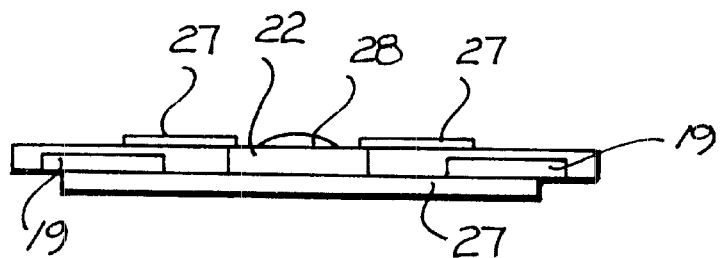
FIG. 4 is an enlarged sectional view taken along line 4—4 of FIG. 1.

FIG. 3 is a sectional view taken along line 3—3 of FIG. 1 and shows a general schematic representation of the cooperation between batteries 19, conductive strips 27 and electric circuit assembly 22, as they would appear contained between overlays 23,29. Electric circuit assembly 22 is furnished with an attached switch 26 and an attached light 30. Switch 26 and light 30 are considered part of electric circuit assembly 22. Electric circuit assembly 22, switch 26 and light 30 are capable of be attached to chassis 12 at separate locations if desired. Light 30 is a light emitting diode or other form of light emitting element, and is capable of being actuated in response to actuation of switch 26. An opening 31 is formed through overlay 29 and light 30 is disposed adjacent opening 31. Light 30 can be disposed to extend into opening 31 and even into and through opening if desired. When light 30 actuates in response to actuation of switch 26 and illuminates, light emitted therefrom projects outwardly from opening 31 and away from device 10 and, more particularly, away from the exterior face of device 10 as defined by overlay 23. This orientation can be reversed, with light 30 disposed in connection with the bottom overlay. FIG. 4 is further instructive of the association between conductive strips 27, batteries 19 and electric circuit assembly 22.

Figure 5:
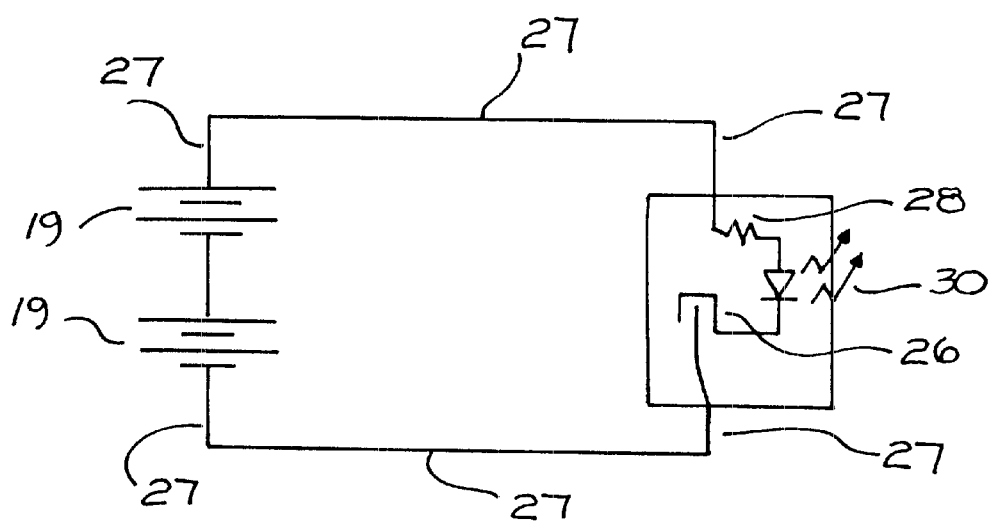
FIG. 5 is a schematic representation of an electrical circuit useful with the device of the invention first illustrated in FIG. 1.

FIG. 5 is illustrative of the electrical system that is employed in connection with the invention, as provided by electric circuit assembly 22. Switch 26 is normally open and requires positive depression by the user so as to close the circuit and provide light 30 with electrical energy so as to actuate it and cause it to become illuminated. Electric circuit assembly 22, which is a printed circuit board, includes light 30, a surface-mount resistor 28 and switch 26. Contact strips 27 connect batteries 19 and also connect batteries 19 to electric circuit assembly 22.

In sum, the invention described in connection with FIGS. 1–6 is a chassis 12 having opposing major faces or sides. Magnifying lens 17 is attached to chassis 17 and is disposed at an opening of chassis 17 and can be viewed from either side thereof for magnifying objects. Chassis 12 carries switch 26 and light 30, and light 30 is capable of being actuated in response to actuation of switch 26. Actuation of switch 26 occurs upon depression thereof such as with a finger/thumb, and a depressive force is capable of being applied against overlay 23, which depressive force is capable of being transferred therefrom to switch 26. Overlay 23 is sufficiently flexible so that it is capable of being easily influenced in response to a modest depressive force, such as from a force applied with a finger. Generally in common with a ubiquitous commercial card such as a credit or debit card, chassis 12 is thin and is approximately 3⅛ inches long by 2⅛ inches wide. And so chassis 12 is of a size that is substantially similar to the size of a commercial card, namely, a bankcard such as a credit card or a debit card. As a result, device 10 is capable of being easily stored in a card sleeve/receptacle of a wallet, a day timer or other personal carrying device of a type having one or more sleeves or receptacles that are designed specifically to accommodate commercial cards such as bank cards and other cards such as a drivers licenses and the like. Device 10 is easily taken up by hand is useful for magnifying objects such as the text of a menu, book, newspaper, etc. By directing light 30 toward an object and depressing switch 26 so as to activate light 30, the object is capable of being illuminated by light 30 and viewed through lens 17 so as to be magnified and illuminated. Light 30 can be located anywhere, but is preferably disposed in such a way that permits objects to be magnified and illuminated, for convenience. Although device 10 employs two batteries 19, less or more can be employed. Also, device 10 can be employed without lens 17, so as to function as an illumination device.

Attention is now directed to FIGS. 6–11, in which there is seen a device, embodying the principle of the instant invention in accordance with an alternate embodiment thereof, generally designated by the reference character 50. FIG. 6 is a top plan view of device 50, FIG. 7 is a side elevation of device 50 with the opposing side elevation being a substantial mirror image thereof, FIG. 8 is a bottom end elevation of device 50 and FIG. 9 is a bottom plan of device 50. In common with the previously described embodiment designated 10, device 50 shares chassis 12 including lens 17 and opening 15 and, as denoted in FIG. 10, frame 14 and overlays 23,29 and, as denoted in FIG. 11, batteries 19, and electrical circuit assembly 22 including light 30. However, and with regard to FIG. 6, a plurality of spaced apart lines 51 are carried by chassis 12. Lines 51 are etched or otherwise applied or attached to the exterior surface 29A of chassis 12 as defined by overlay 29 and are located along an edge of chassis 12 as shown. Lines 51 are graduated in length to indicate the length measurement of an object. Lines 51 are considered length-measuring indicia, and can be applied along another edge of chassis 12 and even along two or more of the four edges chassis 12 defines. The exterior surface 23A of chassis 12 as defined by overlay 23 as depicted in FIG. 9 can be furnished with length measuring indicia if desired, either in lieu of or in addition to the opposing exterior surface of chassis 12 as defined by overlay 29.

With regard to the instant embodiment, device 50 is capable of authorizing a person to charge purchases or services to an account, charges for which the person will be billed periodically. In this vein, a magnetic stripe or magstripe 52 is applied or attached to the exterior surface 29A of chassis 12 as defined by overlay 29, and it can be disposed at the exterior surface 23A of chassis as defined by overlay 23. Magstripe 52 is a surface or medium to which information is capable of being recorded, namely account information that is capable of being read by automated teller machines, store readers and bank and Internet computers. Exterior surface 29A can also be provided with an account number 53, a name 54 of an account holder and an expiration date 55, as with a typical credit or debit card, and this information can be etched, imprinted or otherwise applied or attached to exterior surface 29A. Magstripe 52, number 53, name 54 and expiration date 55 can each be attached to either one of the exterior major surfaces 23A,29A of chassis 12. Device 50 can also be furnished with other identification information such as a signature, picture, work address, home address, etc., so as to function as a means of identification. Magstripe 52 can also be furnished with access codes for the purpose of gaining access to a secured room, building, etc., in response to swiping magstripe 52 through an electronic access device.

With regard to FIG. 11, electric circuit assembly 22 includes conductive attachments or inlays 60. Batteries 19 and light 30 interact with attachments 60. A switch 61 having a conductive feature 62 opposing attachments 60 is pivoted to frame 14 with an integral living hinge and other hinge forms can be used. With regard to FIG. 6, switch 62 extends along a recess 63 formed into an outer edge of chassis 22, namely, the bottom end or edge of chassis 12, so that it can be easily accessed and depressed inwardly toward lens 17. Switch 62 can be located elsewhere and in like form. Switch 62 is normally open and requires positive depression by the user so as to close the circuit and provide light 30 with electrical energy so as to actuate it and cause it to become illuminated.

Figures 12, 13:
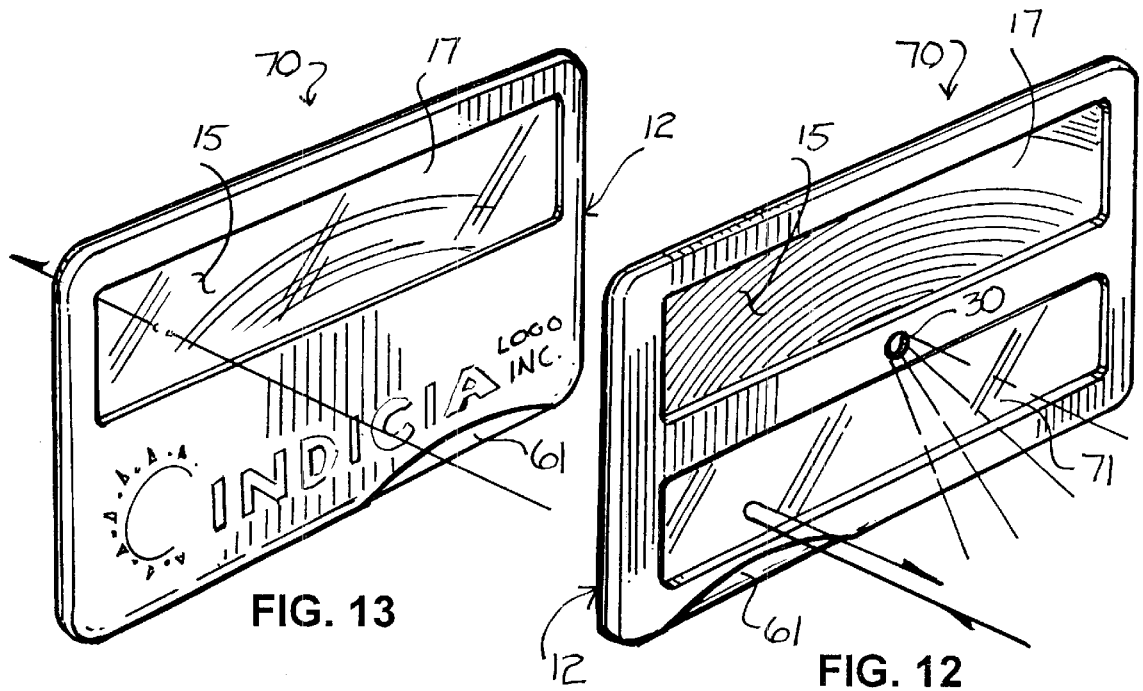
FIG. 12 is an isometric view of a device including a chassis having an opening, a magnifying lens disposed at the opening, a mirror disposed proximate one of the opposing major faces, a switch carried by the chassis, and a light carried by the chassis that is capable of being actuated in response to actuation of the switch, in accordance with the principle of the invention.
FIG. 13 is another isometric view of the device of FIG. 12.

Attention is now directed to FIGS. 12 and 13, in which there is seen a device, embodying the principle of the instant invention in accordance with another alternate embodiment thereof, generally designated by the reference character 70. In common with the previously described embodiment designated 50, device 70 shares chassis 12, lens 17, opening 15, and the electric circuit assembly including light 30 and switch 61. However, and with regard to FIG. 12, a mirror 71 is attached to chassis 12 on the same side thereof as light 30. Mirror 71 is useful as a vanity mirror and can be attached elsewhere. Device 70 is capable of being taken up by hand and held close to the face for the purpose of viewing in mirror 71. By actuating switch 61 and activating light 30 causing it to emit illumination away from mirror 71, objects reflected into mirror 71 can be illuminated.

Figures 14, 15:
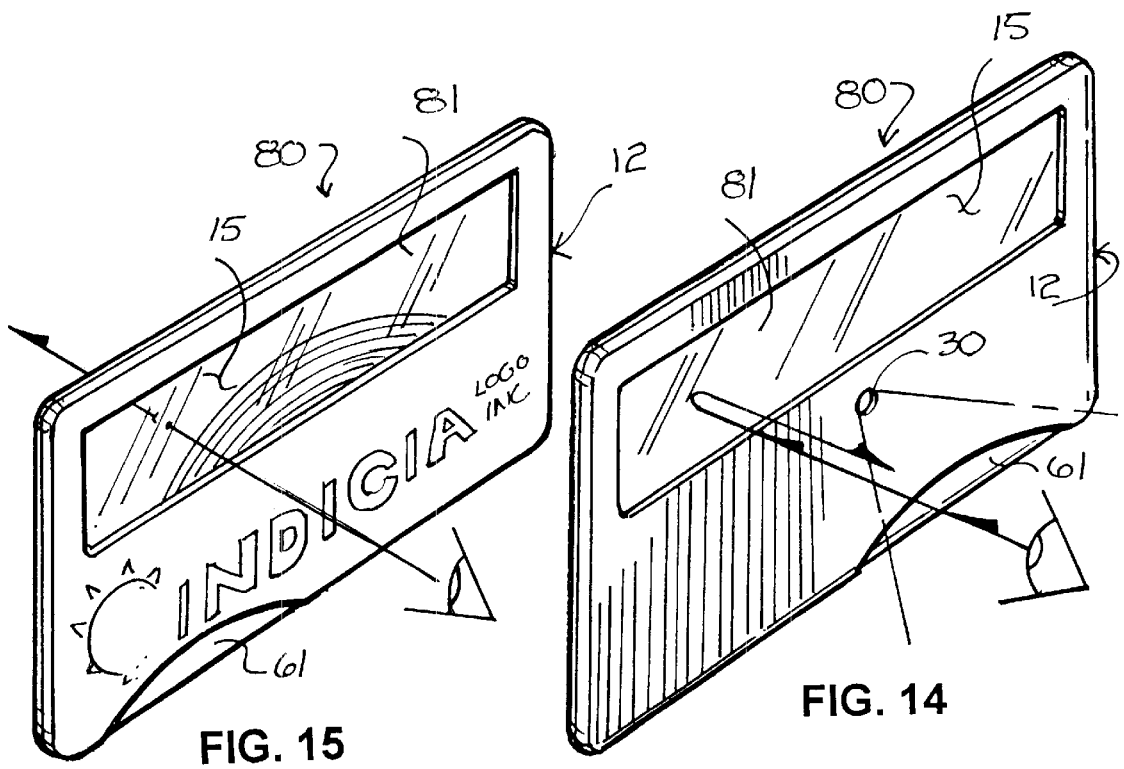
FIG. 14 is an isometric view of a device including a chassis, a two-way lens disposed at the opening, which includes a first side permitting magnification and a second side permitting reflection, a switch carried by the chassis, and a light carried by the chassis that is capable of being actuated in response to actuation of the switch, in accordance with the principle of the invention.
FIG. 15 is another isometric view of the device of FIG. 14.

Attention is now directed to FIGS. 13 and 14, in which there is seen a device, embodying the principle of the instant invention in accordance with yet another alternate embodiment thereof, generally designated by the reference character 80. In common with the previously described embodiment designated 50, device 80 shares chassis 12, opening 15, and the electric circuit assembly including light 30 and switch 61. In the instant embodiment, however, a two-way lens 81 is attached to chassis 12 and is disposed in opening 15. Lens 81 is capable of being viewed from one side for the purpose of magnifying an object as discussed in connection with device 10, and light 30 is disposed with chassis 12 on the side thereof opposing the magnifying side of lens 81 so that magnified objects can be illuminated by light 30 in response to actuation of switch 61. The opposing side of lens 81 is a mirror and, more particularly, a mirrored surface. This mirror of lens 81 is useful as a vanity mirror. Device 80 is capable of being taken up by hand and held close to the face for the purpose of viewing in mirror 81. By actuating switch 61 and activating light 30 causing it to emit illumination away from mirror 81, objects reflected into mirror 8 can be illuminated.

It is instructive of the invention that a commercial card-sized chassis, in accordance with the principle of the invention, is capable of being provided with a variety of convenience features, namely, a magnifying lens, a mirror, a light that is capable of being activated in response to actuation of a switch, etc. These convenience features can be used together or in any desired combination. The invention also contemplates a commercial card-sized chassis having any one of the foregoing convenience features, whether a magnifying lens, a mirror, a light and associated switch, etc.

The present invention is described above with reference to preferred embodiments. However, those skilled in the art will recognize that changes and modifications may be made in the described embodiments without departing from the nature and scope of the present invention. For instance, any of the foregoing embodiments of the invention can be furnished with additional convenience features such as one or more of 1) a clock, whether digital or analog, 2) an attached key chain, 3) an attached attachment element to which a key chain is capable of being engaged, 4) a pivoted letter opener, 5) a pivoted knife, 6) a pivoted nail file, 7) an edge of the chassis formed as a letter opening edge, 8) an edge of the chassis formed as a knife or cutting edge or some other form of utility edge, 9) pivoted scissors, 10) an applied nail file surface, 11) flashing lights for emergency use and an associated switch for activating the flashing lights, a flip-top cover, etc.

Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus comprising:
    a commercial card-sized chassis having an opening;
    a magnifying lens disposed at the opening;
    a switch carried by the chassis; and
    a light carried by the chassis that is capable of being actuated to generate light in response to actuation of the switch, in which the light is disposed for projecting light directly away from the magnifying lens for illuminating objects confronting the magnifying lens.

2. Apparatus of claim 1, wherein the chassis includes opposing major faces and the light is disposed so that it is capable of directing light away from one of the opposing major faces.

3. Apparatus of claim 2, further including a mirror disposed proximate the one of the opposing major faces.

4. Apparatus of claim 1, further including a surface carried by the chassis to which data is capable of being recorded.

5. Apparatus of claim 1, further including length-measuring indicia carried by the chassis.

6. Apparatus comprising:
    a commercial card-sized chassis having opposing major faces;
    a mirror disposed proximate one of the opposing major faces;
    a switch carried by the chassis; and
    a light carried by the chassis that is capable of being actuated to generate light in response to actuation of the switch, in which the light is disposed for projecting light directly away from the mirror for illuminating objects confronting the mirror.

7. Apparatus of claim 6, wherein the light is disposed so that it is capable of directing light away from the one of the opposing major faces.

8. Apparatus of claim 6, further including:
    an opening through the chassis; and
    a magnifying lens disposed at the opening.

9. Apparatus of claim 6, further including a surface carried by the chassis to which data is capable of being recorded.

10. Apparatus of claim 6, further including length-measuring indicia carried by the chassis.

11. Apparatus comprising:
    a commercial card-sized chassis;
    a two-way lens disposed at the opening, which includes a first side permitting magnification and a second side permitting reflection;
    a switch carried by the chassis; and
    a light carried by the chassis that is capable of being actuated in response to actuation of the switch;
    wherein the light is disposed so that is capable of directing light away from the second side of the lens.

12. Apparatus of claim 11, further including a surface carried by the chassis to which data is capable of being recorded.

13. Apparatus of claim 11, further including length-measuring indicia carried by the chassis.

14. Apparatus comprising:
    a commercial card-sized chassis having opposing major faces;
    a switch carried by the chassis;
    a light carried by the chassis that is capable of being actuated to generate light in response to actuation of the switch; and
    the light disposed at one of the opposing major faces for projecting light directly away from and illuminating objects confronting the one of the opposing major faces.

15. Apparatus of claim 14, further including:
    an opening through the chassis; and
    a magnifying lens disposed at the opening.

16. Apparatus of claim 14, further including a mirror disposed proximate the one of the opposing major faces.

17. Apparatus of claim 16, wherein the light is disposed so that it is capable of directing light away from the mirror illuminating objects confronting the mirror.

18. Apparatus of claim 14, further including a surface carried by the chassis to which data is capable of being recorded.

19. Apparatus of claim 14, further including length-measuring indicia carried by the chassis.

20. Apparatus comprising;
a commercial card-sized chassis having opposing major faces and an opening;
a magnifying lens disposed at the opening;
a mirror disposed proximate one of the opposing major faces;
a switch carried by the chassis; and
a light carried by the chassis that is capable of being actuated in response to actuation of the switch;
wherein the light is disposed so that it is capable of directing light away from the one of the opposing major faces.

21. Apparatus of claim 20, further including a surface carried by the chassis to which data is capable of being recorded.

22. Apparatus of claim 20, further including length-measuring indicia carried by the chassis.

23. Apparatus comprising:
a commercial card-sized chassis having opposing major faces and an opening;
a magnifying lens disposed at the opening;
a mirror disposed proximate one of the opposing major faces;
a switch carried by the chassis; and
a light carried by the chassis that is capable of being actuated to generate light in response to actuation of the switch, in which the light is disposed to be capable of projecting light away from and illuminating objects confronting at least one of the magnifying lens and the mirror.

24. Apparatus of claim 23, further including a surface carried by the chassis to which data is capable of being recorded.

25. Apparatus of claim 22, further including length-measuring indicia carried by the chassis.

\* \* \* \* \*